United States Patent [19]

Smith

[11] 3,926,758

[45] Dec. 16, 1975

[54] PREPARATION OF 1,1,2,3-TETRACHLOROPROPENE FROM 2,3-TRICHLOROPROPANE

[75] Inventor: Lowell R. Smith, Chesterfield, Mo.

[73] Assignee: Monsanto Company, St. Louis, Mo.

[22] Filed: Apr. 4, 1974

[21] Appl. No.: 457,952

Related U.S. Application Data

[62] Division of Ser. No. 212,742, Dec. 27, 1971, Pat. No. 3,823,195.

[52] U.S. Cl. ...... 204/163 R; 260/654 D; 260/654 R; 260/658 R
[51] Int. Cl.² ............................................. E01J 1/10
[58] Field of Search ........ 260/654 R, 654 D, 658 R; 204/163 R

[56] References Cited
UNITED STATES PATENTS

| 2,111,043 | 3/1938 | Cass | 260/654 D |
| 2,420,975 | 5/1947 | Plump | 260/658 R |
| 2,446,475 | 8/1948 | Hearne et al. | 260/654 R |
| 2,485,507 | 10/1949 | Perkins | 260/654 D |
| 3,028,439 | 4/1962 | Theiling et al. | 260/654 D |
| 3,398,204 | 8/1968 | Gallant | 260/654 R |

OTHER PUBLICATIONS

Rotshtein et al., J. Org. Chem. of the U.S.S.R., 24–25 (1971).

*Primary Examiner*—Delbert E. Gantz
*Assistant Examiner*—Joseph A. Boska
*Attorney, Agent, or Firm*—William I. Andress

[57] ABSTRACT

This process prepares 1,1,2,3-tetrachloropropene from 1,2,3-trichloropropane. 1,2,2,3-Tetrachloropropane is obtained as a by-product. The product and by-product of this process are useful as intermediates in the preparation of pesticides.

6 Claims, No Drawings

PREPARATION OF 1,1,2,3-TETRACHLOROPROPENE FROM 2,3-TRICHLOROPROPANE

This is a division of application Ser. No. 212,742 filed Dec. 27, 1971, now U.S. Pat. No. 3,823,195.

This invention relates to the preparation of chlorinated hydrocarbons. More particularly it relates to the preparation of 1,1,2,3-tetrachloropropene from 1,2,3-trichloropropane. 1,2,2,3-Tetrachloropropane may also be recovered from the process as a by-product.

1,1,2,3-Tetrachloropropene and 1,2,2,3-tetrachloropropane are important intermediates in the preparation of pesticides, more particularly selective herbicides for the control of noxious weeds in various crops. S-(2,3,3-trichloroallyl) diisopropylthiolcarbamate, described in U.S. Pat. No. 3,330,821, is an example of a selective herbicide which can be prepared from 1,1,2,3-tetrachloropropene. S-(2,3-dichloroallyl) diisopropylthiolcarbamate, also described in U.S. Pat. No. 3,330,821, may be prepared using an intermediate prepared from 1,2,2,3-tetrachloropropane as described in copending application, Ser. No. 210,268 filed Dec. 17, 1971, by Lowell R. Smith, entitled "Process for Preparing 1,2,3-Trichloropropene" now abandoned. Because of the growing demand for effective herbicides and pesticides in general, there is an industry need for more efficient processes for the preparation of pesticides. The present process provides a new method for preparing 1,1,2,3-tetrachloropropene in higher yields and with lower levels of chlorinated waste products than any of the methods of the prior art.

The present invention is a process which comprises

A. feeding a stream comprising 1,2,3-trichloropropane to a liquid-phase chlorinator, B. chlorinating the feed stream so that from about 20 to about 60 percent by weight of the chlorinator effluent remains an unreacted 1,2,3-trichloropropane, C. passing the chlorinator effluent which comprises
1,2,3-trichloropropane,
1,1,2,3-tetrachloropropane,
1,2,2,3-tetrachloropropane,
1,1,1,2,3-pentachloropropane,
1,1,2,2,3-pentachloropropane, and
1,1,2,3,3-pentachloropropane
to a fractionating column, D. fractionating said chlorinator effluent into
a 1,2,3-trichloropropane fraction,
a 1,2,2,3-tetrachloropropane fraction,
a 1,1,2,3-tetrachloropropane fraction,
a 1,1,1,2,3- and 1,1,2,2,3-pentachloropropanes fraction, and
a 1,1,2,3,3-pentachloropropane and heavy ends fraction, E.
1. recycling the 1,2,3-trichloropropane fraction to the chlorinator,
2. removing the 1,2,2,3-tetrachloropropane fraction,
3.
   a. passing the 1,1,2,3-tetrachloropropane fraction from the fractionating column to a caustic dehydrochlorinator,
   b. dehydrochlorinating the 1,1,2,3-tetrachloropropane,
   c. passing the dehydrochlorinator effluent which comprises
   1,1,3-trichloropropene
   1,2,3-trichloropropene, and
   2,3,3-trichloropropene
   to a second liquid-phase chlorinator,
   d. adding chlorine to the carbon/carbon double bond of the compounds contained in the dehydrochlorinator effluent,
   e. passing the second chlorinator effluent which comprises
   1,1,1,2,3-pentachloropropane and
   1,1,2,2,3-pentachloropropane
   to a second caustic dehydrochlorinator,
4. passing the 1,1,1,2,3- and 1,1,2,2,3-pentachloropropanes fraction from the fractionating column to the second caustic dehydrochlorinator, F. dehydrochlorinating the second chlorinator effluent and the 1,1,1,2,3- and 1,1,2,2,3-pentachloropropanes fraction from the fractionating column, G. passing the second dehydrochlorinator effluent, which comprises
1,1,2,3-tetrachloropropene, and
2,3,3,3-tetrachloropropene
to an isomerizer packed with siliceous granules having a polar surface, and H. isomerizing the
2,3,3,3-tetrachloropropene to
1,1,2,3-tetrachloropropene
by heating the second dehydrochlorinator effluent in contact with the siliceous granules to a temperature of from about 150°C. to about 200°C. for from about 0.4 to about 2 hours.

The liquid-phase chlorinator substitutes chlorine for hydrogen by the free radical method. Formation of free-radicals may be initiated by exposing the contents of the chlorinator to actinic light or by conducting the chlorination in contact with a catalytic amount of a free-radical forming catalyst such as one of the peroxides, i.e. benzoyl peroxide, lauryl peroxide, cumene peroxide, urea peroxide, tertiary butyl peroxide, etc., or other free-radical formers such as azobisisobutyronitrile, etc. These liquid-phase chlorination methods are well known to the skilled artisan and the particular method employed is not a part of the invention. However, it is critical that the extent of chlorination of the feed stream be controlled so that from about 20 to about 60 percent by weight of the feed remains as unreacted 1,2,3-trichloropropane in order to limit the number of chlorinated products obtained. It is preferred to chlorinate so that from about 30 to about 50 percent by weight of the feed stream remains unreacted, and more preferred to chlorinate so that from about 35 to about 45 percent by weight of the feed stream remains unreacted.

Control of the chlorination within the stated limits gives an effluent comprised of the following compounds with boiling points as shown:

|  | Boiling Point Degrees, Centigrade (°C.) |
|---|---|
| 1,2,3-trichloropropane | 157 |
| 1,2,2,3-tetrachloropropane | 163 |
| 1,1,2,3-tetrachloropropane | 179 |
| 1,1,1,2,3-pentachloropropane | 191 |
| 1,1,2,2,3-pentachloropropane | 191 |
| 1,1,2,3,3-pentachloropropane | 198 |

The compounds are readily separated into 5 fractions in a conventional fractionating column. The fractionating column may be of any suitable design and may utilize trays or packing to make the necessary separations. Since corrosion is a consideration, a packed column is preferred. While the type of fractionating column is not critical, it is necessary that the five fractions, comprised of the following components, be separated in order to obtain the high yields of the present process:

Fraction 1 — 1,2,3-trichloropropane
Fraction 2 — 1,2,2,3-tetrachloropropane
Fraction 3 — 1,1,2,3-tetrachloropropane
Fraction 4 — 1,1,1,2,3- and 1,1,2,2,3-pentachloropropanes
Fraction 5 — 1,1,2,3,3-pentachloropropane Fraction 1 generally consists essentially of 1,2,3-trichloropropane and any other light ends which may be present in the process. This entire stream is recycled to the chlorinator.

Fraction 2 is a by-product stream. The 1,2,2,3-tetrachloropropane may be utilized, as is or after further purification, as a raw material in other processes. It is preferred to use Fraction 2, as is, as a raw material in the manufacture of 1,2,3-trichloropropene.

Fraction 3 is taken, as is, to a caustic dehydrochlorinator which converts the tetrachloropropane to a mixture of trichloropropenes. The design of the dehydrochlorinator and the method of dehydrochlorination in the presence of caustic are conventional and not critical to the invention. After dehydrochlorination the effluent which normally consists essentially of 1,1,3-trichloropropene, 1,2,3-trichloropropene and 2,3,3-trichloropropene is passed to a second liquid-phase chlorinator. This second liquid-phase chlorinator by conventional means adds chlorine at the double bond to form 1,1,2,2,3-pentachloropropane and 1,1,1,2,3-pentachloropropane. The effluent of this second chlorinator is then passed to a second caustic dehydrochlorinator. The handling of Fraction 3 is another key feature of the process. Although the methods employed are admittedly conventional, the result is novel. Fraction 3 as it passes from the fractionator is a useless by-product. However, by removing HCl and then adding Cl$_2$ this useless by-product is converted to a valuable precursor for 1,1,2,3-tetrachloropropene. This conversion is important in obtaining the high yield of product from the present process.

Fraction 4 is also passed to the second caustic dehydrochlorinator. Fraction 4 and the second chlorinator effluent may enter the second caustic dehydrochlorinator as separate streams or as a single combined stream. The method of operation of this second dehydrochlorinator is not critical to the invention and may be the same as or different from the method of operation of the dehydrochlorinator which dehydrochlorinates Fraction 3 to mixed trichloropropenes.

Fraction 5 is a waste stream. It may be sent directly to waste disposal or utilized for other purposes. The disposal or utilization of Fraction 5 is not critical to the present invention.

The effluent from the second caustic dehydrochlorinator normally consists essentially of product 1,1,2,3-tetrachloropropene and 2,3,3,3-tetrachloropropene. This stream is passed to an isomerizer which converts almost totally the 2,3,3,3-tetrachloropropene to 1,1,2,3-tetrachloropropene. This isomerization is a particularly unique feature of the present process. The isomerizer is a vessel of any suitable design packed with siliceous granules having a polar surface. The size and shape of the granules will vary depending on the particular operating conditions desired for the isomerizer. Factors to be considered in determining granule size and shape are basically process design considerations known to the skilled process engineer, such as pressure drop across the vessel, vessel inventory, process flow rate, tolerable packing loss, etc. Siliceous, i.e. silica containing, compounds which may be used in this process include a variety of calcined and uncalcined clays such as montmorillonite, kaolinite, bentonite, hectorite, beidellite and attapulgite; other mineral salts of silica such as chrysolite, saponite, feldspar, quartz, wollastonite, mullite, kyanite, amosite, cristobalite, chrysotile, crocidolite, mica, spodumene and garnet; siliceous non-mineral substances such as silica gel, fumed silica, fibrous aluminum silicate and glass. It is preferred that the granules be clay and more preferred that the granules be attapulgite.

The isomerizer operates at a temperature of from about 150°C. to about 200°C., preferably from about 165°C. to about 190°C. The isomerization is usually carried out at atmospheric pressure, but higher or lower pressures may be utilized if equipment and other factors favor such higher or lower pressures. The isomerization may be carried out in a closed vessel or under reflux. It is particularly preferred to carry out the isomerization under reflux at atmospheric pressure. Under the stated conditions the second caustic dehydrochlorinator effluent is isomerized to a stream consisting essentially of 1,1,2,3-tetrachloropropene in from about 0.4 to about 2 hours, preferably from about 0.5 to about 1.3 hours and more preferably from about 0.6 to about 1 hour. The effluent from the isomerizer may be used, as is, in the preparation of S-(2,3,3-trichloroallyl) diisopropylthiolcarbamate or further purified for use in said preparation or other processes.

By this process about 39 percent by weight of 1,2,3-trichloropropane is converted to 1,2,2,3-tetrachloropropane and about 46 percent by weight of 1,2,3-trichloropropane is converted to 1,1,2,3-trichloropropene giving a total conversion to useful products of about 85 percent by weight of 1,2,3-trichloropropane.

As used herein, the term "effluent" refers to the product stream flowing from the specified vessel.

The following examples are presented as illustrative of the process of this invention and are not to be construed as limitative thereof.

EXAMPLE 1

This example illustrates an embodiment of the chlorination step in the process of this invention.

Chlorination of 1,003 grams (g.) of 1,2,3-trichloropropane is carried out in an open vessel exposed to ultraviolet light from a 5 inch quartz short wave lamp (2537 Angstrom units) suspended immediately above the surface of the 1,2,3-trichloropropane. The vessel is heated to from about 40° to about 50°C. and about 355 grams of chlorine gas is bubbled through the 1,2,3-trichloropropane at a rate of from about 0.5 to about 1 g. per minute. Upon completion of the chlorine addition the composition of the mass is determined by chromatographic analysis and found to be about as follows:

|  | g. | Percent |
|---|---|---|
| 1,2,3-trichloropropane | 483 | 40.4 |
| 1,2,2,3-tetrachloropropane | 259 | 21.7 |
| 1,1,2,3-tetrachloropropane | 374 | 31.3 |
| 1,1,1,2,3- and 1,1,2,2,3-pentachloropropanes | 38 | 3.2 |
| 1,1,2,3,3-pentachloropropane and | 18 | 1.5 |

-continued

| | g. | Percent |
|---|---|---|
| heavy ends | 1172 | 98.1 |

EXAMPLE 2

This example illustrates an embodiment of the chlorination step in the process of this invention.

The procedure of Example 1, except as noted below, is followed to give a chlorinator effluent composition about as shown:

| | |
|---|---|
| Wt. of 1,2,3-trichloropropane | 358 g. |
| Wt. of chlorine | 125 g. |
| Temperature | 25°C. |
| Chlorinator effluent | 413 g. |
| Composition in percent by weight | |
| 1,2,3-trichloropropane | 40.6 |
| 1,2,2,3-tetrachloropropane | 22.2 |
| 1,1,2,3-tetrachloropropane | 30.3 |
| 1,1,1,2,3- and 1,1,2,2,3-pentachloropropanes | 3.6 |
| 1,1,2,3,3-pentachloropropane and heavy ends | 1.6 |
| | 98.3 |

EXAMPLES 3 AND 4

These examples illustrate chlorinations outside the process of this invention.

The procedure of Example 1, except as noted below, is followed to give chlorinator effluent compositions as shown:

| | Example 3 | Example 4 |
|---|---|---|
| Wt. of 1,2,3-trichloropropane | 144 g. | 144 g. |
| Wt. of chlorine | 99 g. | 119 g. |
| Temperature | 25°C | 25°C |
| Chlorinator effluent | | |
| Composition in percent by weight | | |
| 1,2,3-trichloropropane | 4.9 | 1.0 |
| 1,2,2,3-tetrachloropropane | 28.0 | 24.2 |
| 1,1,2,3-tetrachloropropane | 32.4 | 23.6 |
| 1,1,1,2,3- and 1,1,2,2,3-pentachloropropanes | 19.8 | 28.5 |
| 1,1,2,3,3-pentachloropropane and heavy ends | 14.2 | 22.0 |
| | 99.3 | 99.3 |

EXAMPLE 5

This example illustrates the dehydrochlorination of 1,1,2,3-tetrachloropropane.

The chlorinator effluent of Example 1 is fractionated at a pressure of from about 25 to about 36 millimeters of mercury in a 2 inch 20 tray Oldershaw column. A 304.8 g. fraction comprising 1,1,2,3-tetrachloropropane is removed and charged to a suitable vessel equipped with an agitator and heated to about 95°C. About 69.7 g. of sodium hydroxide is dissolved in about 278.8 g. of water. This caustic solution is slowly added to said fraction over about 2 ¼ hours. The mass is stirred for 2 ½ hours at about 95°C. It is determined that about 2.7 percent of the feed remains unreacted and that the pH of the mass is about 6.0. Thereupon about 2 g. of sodium hydroxide dissolved in about 2 g. of water and a small quantity of an anti-foam agent is added. The mass is then heated at about 95°C. for an additional 15 minutes. The mass is then steam distilled until the vapor temperature is 99°C. The distillate forms two layers. The layers are separated and the organic layer is found to weigh about 233.6 g. and to contain:

| | Percent by Weight |
|---|---|
| 1,1,3-trichloropropene | 22 |
| 1,2,3-trichloropropene | 67 |
| 2,3,3-trichloropropene | 9 |

The mixed trichloropropenes are dried over molecular sieves and filtered. About 228.5 g. are recovered.

EXAMPLE 6

This example illustrates the addition of chlorine to the carbon/carbon double bond of mixed trichloropropenes.

The 228.5 g. of mixed trichloropropenes of Example 5 are charged to a suitable open vessel and heated to about 55°C. The contents are exposed to ultra-violet light from a 5 inch quartz short wave lamp (2537 Angstrom units) suspended immediately above the surface. About 111 g. of chlorine gas are bubbled through the contents at a rate of about 0.5 to 1 g. per minute. About 339.1 g. of 1,1,1,2,3- and 1,1,2,2,3-pentachloropropanes are obtained. This chlorination as well as the chlorination of Example 1 may be carried out with equal facility in the presence of a catalytic amount of azobisisobutyronitrile or other free-radical forming catalyst. When using such a catalyst the presence of ultra-violet light is not necessary.

EXAMPLE 7

This example illustrates the dehydrochlorination of mixed 1,1,1,2,3- and 1,1,2,2,3-pentachloropropanes.

The 339.1 g. of 1,1,1,2,3- and 1,1,2,2,3-pentachloropropanes obtained in Example 6 are charged to a suitable vessel equipped with an agitator and heated to about 95°C. About 65.2 g. of sodium hydroxide are added to and dissolved in about 260.8 g. of water. This solution is slowly added to the mixed pentachloropropanes over a period of about 1 ½ hours. The mass is stirred at a temperature of about 95°C. for about 2 ½ hours and then steam distilled until the vapor temperature is 99°C. The distillate forms two layers. The layers are separated and the organic layer is found to weigh about 263.5 g. and to contain:

| | Percent by Weight |
|---|---|
| 2,3,3,3-tetrachloropropene | 33.4 |
| 1,1,2,3-tetrachloropropene | 58.7 |

EXAMPLE 8

This example illustrates the isomerization of 2,3,3,3-tetrachloropropene to 1,1,2,3-tetrachloropropene.

The 263.5 grams of mixed tetrachloropropenes of Example 7 are charged to a suitable vessel equipped with a reflux condenser. To the mixed tetrachloropropenes is added about 30 grams of about 20 to 40 mesh (U.S. Seive) granules of attapulgus clay. (Prior to this addition the clay is previously refluxed with mixed tetrachloropropenes then filtered but not dried in order to simulate continuous plant operation and minimize yield loss by adsorption on the clay's surface.) The mass is refluxed at atmospheric pressure for about 40 minutes and the clay is removed by filtration. Analysis shows about 92.3 percent by weight yield of 1,1,2,3-tetrachloropropene.

While this invention has been described with respect to certain embodiments, it is to be understood that it is not so limited and that variations and modifications thereof obvious to those skilled in the art to which this invention appertains can be made without departing from the spirit or scope thereof.

What is claimed is:

1. A process which comprises feeding a stream consisting essentially of 1,2,3-trichloropropane to a liquid-phase chlorinator, chlorinating the feed stream with chlorine gas in the presence of actinic light so that from about 20 to about 60 percent by weight of the chlorinator effluent remains as unreacted 1,2,3-trichloropropane, passing the chlorinator effluent to a fractionating column, fractionating said chlorinator effluent into a 1,2,3-trichloropropane fraction, a 1,2,2,3-tetrachloropropane fraction, a 1,1,2,3-tetrachloropropane fraction, a 1,1,1,2,3- and 1,1,2,2,3-pentachloropropanes fraction, and a 1,1,2,3,3-pentachloropropane and heavy ends fraction, recycling the 1,2,3-trichloropropane fraction from the fractionating column to the chlorinator, passing the 1,1,2,3-tetrachloropropane fraction from the fractionating column to a caustic dehydrochlorinator, dehydrochlorinating the 1,1,2,3-tetrachloropropane, passing the dehydrochlorinator effluent which comprises mixed trichloropropenes to a second liquid-phase chlorinator, adding chlorine in the presence of actinic light to the carbon/carbon double bond of the trichloropropenes contained in the dehydrochlorinator effluent, passing the second chlorinator effluent which comprises 1,1,1,2,3-pentachloropropane and 1,1,2,2,3-pentachloropropane to a second caustic dehydrochlorinator, passing the 1,1,1,2,3- and 1,1,2,2,3-pentachloropropanes fraction from the fractionating column to the second caustic dehydrochlorinator, dehydrochlorinating the second chlorinator effluent and the 1,1,1,2,3- and 1,1,2,2,3-pentachloropropanes fraction from the fractionating column, passing the second dehydrochlorinator effluent which comprises 1,1,2,3-tetrachloropropene, and 2,3,3,3-tetrachloropropene to an isomerizer packed with clay granules, and isomerizing 2,3,3,3-tetrachloropropene to 1,1,2,3-tetrachloropropene by heating the second dehydrochlorinator effluent in contact with said clay granules to a temperature of from about 150°C. to about 200°C. for from about 0.4 to about 2 hours and removing the isomerizer effluent comprising the product 1,1,2,3-tetrachloropropene.

2. The process of claim 1 wherein said feed stream is chlorinated so that from about 30 to about 50 percent of the chlorinator effluent remains as 1,2,3-trichloropropane.

3. The process of claim 1 wherein 1,2,2,3-tetrachloropropane is recovered from the fractionating column as a by-product.

4. The process of claim 1 wherein the clay is attapulgite.

5. The process of claim 1 wherein the second dehydrochlorinator effluent is isomerized under reflux conditions.

6. The process of claim 5 wherein the second dehydrochlorinator effluent is refluxed for from about 0.5 to about 1.3 hours.

* * * * *